United States Patent [19]

Davis

[11] Patent Number: 4,684,155

[45] Date of Patent: Aug. 4, 1987

[54] PIPE ELBOW WITH ABRASION RESISTANT COMPOSITE INNER LINER AND METHOD FOR FORMING

[75] Inventor: Thomas E. Davis, Anderson, Ind.

[73] Assignee: Cerline Ceramic Corporation, Anderson, Ind.

[21] Appl. No.: 850,588

[22] Filed: Apr. 11, 1986

[51] Int. Cl.⁴ ............................................. F16L 58/14
[52] U.S. Cl. ........................................ 285/16; 285/55; 285/179; 285/93; 138/139; 138/149; 138/36; 138/DIG. 6; 138/175; 264/264; 406/193
[58] Field of Search .................. 285/16, 55, 15, 17, 285/179, 45, 182, 149, 93; 138/36, DIG. 6, 140, 149, 139, 172, 174, 175; 406/193; 264/264, 130

[56] References Cited

U.S. PATENT DOCUMENTS

| | | | |
|---|---|---|---|
| 785,176 | 3/1905 | Mommertz | 138/140 |
| 898,882 | 12/1908 | Hawkins | 285/16 |
| 1,044,181 | 11/1912 | Hudson | 285/16 |
| 1,211,784 | 1/1917 | Stuart | 406/193 |
| 1,237,381 | 8/1917 | Poppenhusen | 285/16 |
| 1,518,705 | 12/1924 | Raun | 138/173 |
| 2,057,869 | 10/1936 | Young | 285/16 |
| 3,794,359 | 2/1974 | Fisher | 285/55 |
| 4,130,300 | 12/1978 | Sheridan | 285/16 |
| 4,199,010 | 4/1980 | McGuth et al. | 138/140 |
| 4,230,293 | 10/1980 | Hamm et al. | 138/174 |
| 4,251,170 | 2/1981 | Sheridan | 406/197 |
| 4,259,993 | 4/1981 | Scholz | 138/155 |
| 4,307,140 | 12/1981 | Davis | 156/276 |
| 4,391,664 | 7/1983 | Kramer | 156/276 |
| 4,478,253 | 10/1984 | Everett | 138/140 |
| 4,526,203 | 7/1985 | Klimpl | 406/193 |
| 4,554,721 | 11/1985 | Carty et al. | 406/193 |

FOREIGN PATENT DOCUMENTS

| | | | |
|---|---|---|---|
| 508963 | 10/1930 | Fed. Rep. of Germany | 285/16 |
| 561896 | 9/1932 | Fed. Rep. of Germany | 406/193 |
| 16809 | 2/1980 | Japan | 406/193 |
| 770414 | 3/1957 | United Kingdom | 406/193 |
| 1563784 | 4/1980 | United Kingdom | 285/179 |
| 2084533 | 4/1982 | United Kingdom | 406/193 |

Primary Examiner—Cornelius J. Husar
Assistant Examiner—Eric K. Nicholson
Attorney, Agent, or Firm—Woodard, Emhardt, Naughton Moriarity & McNett

[57] ABSTRACT

A pipe elbow having a composite ceramic wear liner which is particularly adapted to resist abrasive wear from particulate material conveyed through the pipe elbow. The composite ceramic wear liner is comprised of four series of polyhedron shaped ceramic wear blocks disposed at angularly spaced locations around the circumference of the elbow flow passageway. A mixture of wear resistant particles and binder surrounds the wear bricks and provides an abrasion resistant wear surface along those portions of the pipe elbow which are less subject to abrasive wear. The pipe elbow is provided with a removable cover plate in order to access and replace the series of wear bricks located along the outside center line of the pipe elbow most subject to wear.

15 Claims, 7 Drawing Figures

PIPE ELBOW WITH ABRASION RESISTANT COMPOSITE INNER LINER AND METHOD FOR FORMING

BACKGROUND OF THE INVENTION

The subject invention relates generally to pipe fittings used to transport abrasive materials such as coal, ash, etc. in connection with industrial applications and, more particularly, to a pipe elbow having an inner lining which is highly resistant to abrasive wear from the material transported through it.

In conveying abrasive materials such as, for example, coal in a slurry, curved sections of pipe must be made of a highly durable material in order to withstand abrasive contact with the material being conveyed therethrough. For this purpose, it is a well known practice to provide pipe elbows with an abrasion resistant inner lining to increase the wear life of the pipe elbow. Due to their excellent wear characteristics, ceramic materials have become increasingly popular for use in lining pipe casings subjected to high abrasive wear conditions.

One known method for providing a ceramic inner wear liner for a pipe fitting involves bricking the inner surface of the pipe elbow casing with a plurality of ceramic wear bricks. The wear bricks are fitted into position inside the casing in a series of rings in a keystone arrangement along the length of the elbow. Unfortunately, it is extremely expensive to provide a ceramic inner lining for a pipe elbow in this fashion because each brick is differently sized and shaped according to its angular location about the center line of the pipe elbow. Nevertheless, the use of ceramic wear bricks to totally line the inner surface of a pipe elbow results in a pipe elbow having an extremely long wear life.

Another method for providing a ceramic inner lining involves pouring a castable ceramic material inside the casing of the pipe elbow in the space between the casing and a sacrificial liner. The inner disposed sacrificial liner is constructed to wear away very quickly in use, thereupon exposing the wear resistant castable ceramic. Unfortunately, while a castable ceramic liner is much cheaper to construct than a wear liner composed of ceramic wear bricks, castable ceramic liners are not nearly as resistant to wear.

An inherent disadvantage in the construction of many pipe elbows having wear resistant inner liners is that once they have worn through they are often not repairable. This is unfortunate because frequently only a portion of the wear liner along the outside center line of the pipe elbow has experienced substantial wear. Since it is very expensive to replace an entire pipe elbow, it would be a significant cost savings to replace only the worn out sections of the elbow so as to render it useful for further service. Optimally, the pipe elbow should be constructed so as to permit repairs to be made on-site without having to remove the elbow from adjacent pipe fittings and lengthening system down time.

The following patent reference are believed to be generally pertinent to the present invention:

| Patent No. | Inventor |
| --- | --- |
| 3,794,359 | Fisher |
| 4,130,300 | Sheridan |
| 785,176 | Mommertz |
| 4,199,010 | McGuth et al. |
| 4,478,253 | Everett |
| 4,251,170 | Sheridan |
| 1,518,705 | Raun |

U.S. Pat. No. 3,794,359 to Fisher discloses a pipe fitting having an inner wear resistant lining comprised of a series of part circular ceramic wear plates and a grout material comprising a mixture of thermosetting resin and metal coated ceramic particles. The ceramic wear plates are disposed along the portion of the pipe elbow subjected to greatest wear.

U.S. Pat. No. 4,478,253 to Everett discloses an erosion resistant pipe elbow comprising a metal outer casing and an inner castable ceramic material.

U.S. Pat. No. 4,251,170 to Sheridan discloses a ceramic wear liner for small pipe lines having an inside diameter of 2"–8". The pipe liner is disposed on the outside of the pipe casing along the outer bend of the elbow.

U.S. Pat. No. 4,130,300 to Sheridan discloses a composite abrasion resistant pipe elbow having a wear resistant liner composed of a plurality of ceramic wear blocks disposed about the outside bend portion of the pipe elbow. The pipe elbow has a removable cover plate for inspection and replacement of the wear blocks if they are excessively worn. Only a portion of the inner circumference of the pipe elbow is provided with a wear resistant inner lining and there is no way to monitor the degree to which the blocks have been worn other than by necessitating a system shutdown.

U.S. Pat. No. 785,176 to Mommertz discloses an abrasion resistant pipe liner for straight sections of pipe.

U.S. Pat. No. 1,518,705 to Raun discloses a pipe elbow provided with corrugations along the inner portion of the elbow which is subjected to abrasive contact by pieces of material flowing therethrough. The corrugations provide a wearing surface for the pieces of material to ride upon.

U.S. Pat. No. 4,199,010 to McGuth, et al. discloses a pipe elbow having a circular casted ceramic inner liner within an outer metallic casing.

SUMMARY OF THE INVENTION

One embodiment of the present invention is characterized by a pipe elbow having a casing and an inner wear liner disposed within the casing. The inner wear liner defines a generally tubular flow passageway along the length of the pipe elbow. The inner wear liner is characterized by a plurality of polyhedron shaped abrasion resistant wear bricks arranged along the length of the pipe elbow and disposed within a castable mixture of wear resistant particles and binder. The wear bricks are disposed about that portion of the inner wear liner which subscribes an arc extending at least about 15° on either side of the outside center line of the pipe elbow. Each of the wear bricks has a planar shaped surface which faces in a direction towards the center line of the pipe elbow.

Accordingly, it is an object of the present invention to provide an improved pipe elbow particularly adapted for transporting highly abrasive materials therethrough.

It is a further object of the present invention to provide a pipe elbow having an inner abrasive resistant wear liner of composite construction which exhibits greatest resistance to wear along the outside center line of the pipe elbow.

It is a yet further object of the present invention to provide a pipe elbow having a wear liner of a relatively inexpensive composite construction which employs commercially available standard sized and shaped ceramic wear bricks.

An additional object of the present invention is to provide a pipe elbow having the above features in which the ceramic wear bricks aligned along the outside center line of the pipe elbow have a wearing surface which is oriented and shaped to more widely distribute the area of highest abrasive contact from material flow.

Another object of the present invention is to provide a pipe elbow having all of the above features and which is constructed to permit replacement of worn out wear bricks and thereby further extend the useful life of the elbow.

Related objects and advantages of the present invention will become more apparent by reference to the following figures and detailed description.

DESCRIPTION OF THE PREFERRED EMBODIMENT

Figure 1:
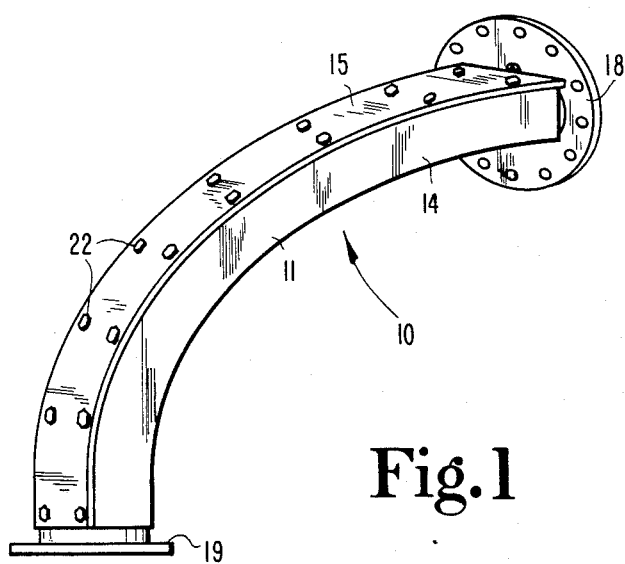
FIG. 1 is a perspective view of the pipe elbow of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings in detail, the pipe elbow of the present invention is generally designated at 10. Pipe elbow 10 includes an outer metallic casing 11 of generally rectangular cross-sectional shape and annular shaped connecting flanges 18 and 19 welded to bulkheads at the ends of casing 11, the flanges serving to connect the pipe elbow to similarly formed flanges on adjacent pipe sections. While the pipe elbow 10 shown is a standard 90° elbow, the invention is not restricted thereto, and may include other curved shapes. Sides 12, 13, and 14 of the outer casing 11 are welded at their joints and a removable top cover plate 15 is bolted to sides 12 and 14 by mounting bolts 22 and sealed by a gasket. The outer casing 11 may be made of any suitable pipe casing material such as for example stainless steel.

Figure 2:
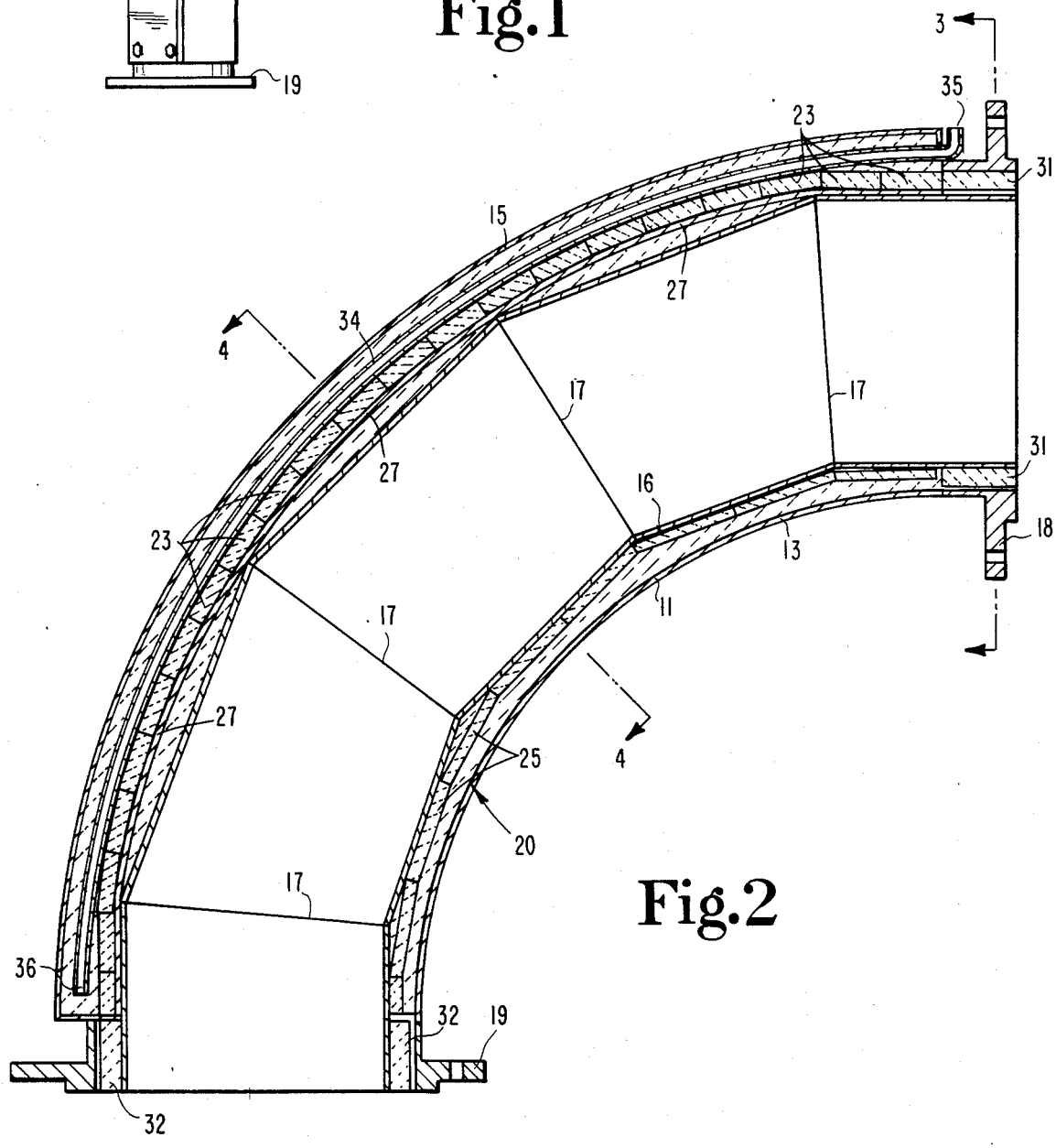
FIG. 2 is a full section view of the pipe elbow of FIG. 1.
Figure 3:
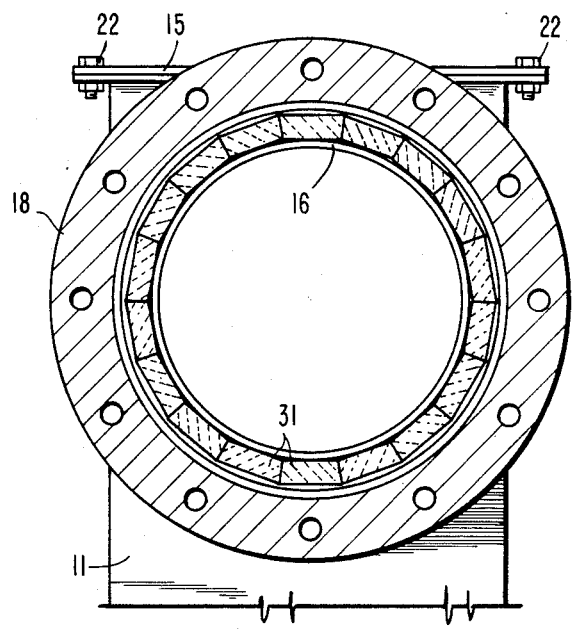
FIG. 3 is a section view taken along line 3—3 of FIG. 2.

Within outer casing 11 is a sacrificial liner 16 which extends along the entire length of the pipe elbow. Liner 16 is comprised of a series of steel cylindrical pipe sections which are mitred and welded together at their respective joints 17. As seen in FIG. 2, liner 16 is formed of three 22½° mitred pipe sections and two 11¼° mitred end pipe sections so as to form the 90° elbow. The liner 16 is aligned on a common center line with the outer casing 11 and may be secured to the outer casing 11 by means of metal bulkheads 27 welded to the outer casing 11 and liner 16.

A composite inner wear liner 20 is disposed in the circumferential space between sacrificial liner 16 and outer casing 11. Wear liner 20 includes four series of wear bricks, 23, 24, 25 and 26 disposed along the length of the elbow between flanges 18 and 19 within a castable mixture 21 of wear resistant particles and suitable binder. Wear bricks 23 are aligned along the outside center line of the pipe elbow and wear bricks 23, 24, 25 and 26 are angularly spaced 90° apart from each other relative to the center line of the pipe elbow. The castable mixture 21 may be any castable composition which has sufficiently high wear resistance properties to render it useful as a wear liner for pipe elbows such as described, one example being a high alumina (93%) ceramic type marketed under the trademark Cerline ® manufactured by Cerline Ceramic Corp. of Anderson, Ind.

In addition to wear bricks 24-26, two series of wear bricks 31 and 32 are disposed at the respective ends of the elbow within the flanges 18 and 19. The series of wear bricks 31 and 32 extend in a keystone arrangement around the entire inner circumference of the flanges 18 and 19.

The wear bricks 23-26 and 31-32 are characterized by a hexahedronal shape and are preferably composed of a substantially pure alumina ceramic material formed at elevated temperatures which exhibit a higher resistance to wear from abrasion than the castable mixture 21. Wear bricks of this type are manufactured by Champion Ceramic Division of Champion Spark Plug, Inc. located in Detroit, Mich. Wear bricks 23 aligned along the outside center line of the pipe elbow have a greater thickness than wear bricks 24-26 since they will receive the greatest amount of wear. In the embodiment shown, the wear bricks 23 have a thickness of 1" while the wear bricks 24, 25, and 26 have a thickness of ½".

Preferably, the wear bricks 23, 31 and 32 are mitred pipe bricks widely used to line straight pipe sections. For many applications, such as a 30" center line radius pipe elbow having a 10" inner diameter, a standard 2 and ¼" by 9" by 1" hexahedronal wear brick may be employed for wear bricks 23 while wear bricks 31 and 32 may be a 2 and ¼" by 3" by 1" standard size. Preferably, wear bricks 24-26 are plate lining bricks, which in the example described may have a 4" by 6" by ½" standard size.

The front and rear ends of the wear bricks 23-26 are mitred so as to form a tight fitting joint with adjacent bricks along the length of the pipe elbow. Wear brick manufacturers usually provide several miter sizes for such bricks, such as for example 4 and ½°, 6° and 9°, and these standard miter sizes will be acceptable for many, if not most applications. If a non-standard miter is desirable, the wear bricks may be provided with the desired miter by such means as cutting the sides with a diamond tip saw.

Figure 4:
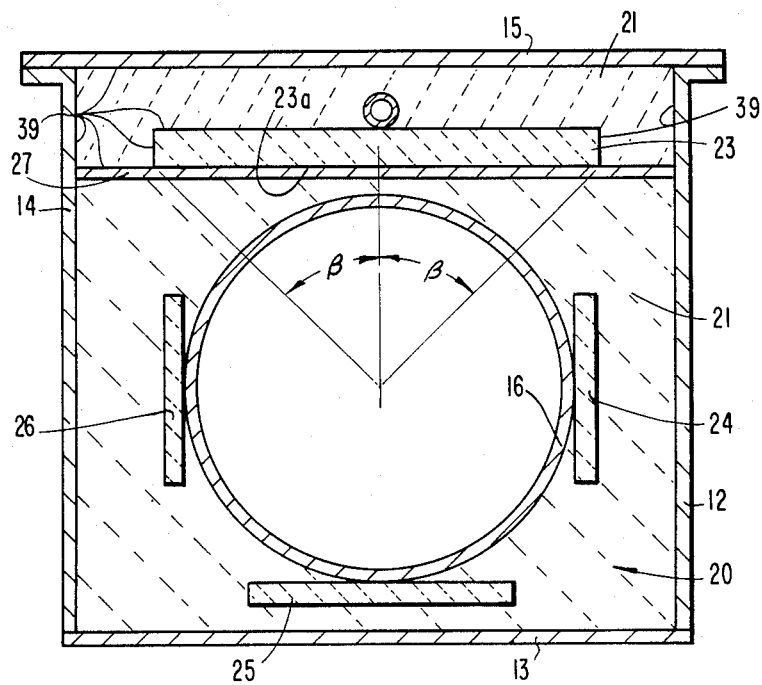
FIG. 4 is a section view taken along line 4—4 in FIG. 2.

The series of wear bricks 23 aligned along the outside center line are positioned such that the inside facing surface 23a is perpendicular to the plane of curvature of the pipe elbow 10. It is perceived that wear bricks having an annular shaped cross sectional wear surface tend to cause an undesirable concentration of the abrasive wear forces at the outside center line of the pipe elbow. By using wear bricks 23 along the outside center line of the pipe elbow having a flat wearing surface 23a perpendicular to the plane of curvature of the elbow, particulate material flowing through the pipe elbow will contact the outer bend in a more evenly and widely dispersed fashion and therefore increase the wear life of the bricks. As seen in FIG. 4, the wear bricks 23 preferably have a cross sectional width sized to subscribe an arc $\beta$ extending approximately 45° on either side of the outside center line of the pipe elbow. The cross sectional width of wear bricks 23 could however be varied so as to subscribe an arc $\beta$ anywhere in a range of 15°-60° with acceptable results.

It is anticipated that in certain situations the degree of wear abrasion along circumferential portions of the pipe elbow away from the outside center line will be sufficiently low that the castable ceramic mixture 21 alone will provide acceptable resistance to wear. Thus, it may be unnecessary to provide the inner wear liner 20 with the wear bricks 24, 25, and 26. A further possibility is that only the series of wear bricks 23 and 25 along the outside and inside center line of the pipe elbow are needed, in which case the series of bricks 24 and 26 may be dispensed with.

A small diameter metal tube 34 extends along the length of the pipe elbow on the side of wear bricks 23 opposite the center line of the pipe elbow. The tube 34 is aligned along the outside center line of the pipe elbow and is secured to the back side of the wear bricks 23 by a suitable adhesive. End 35 of the tube 34 is open and extends outside the outer casing 11 adjacent the flange 18. The other end 36 of the tube 34 is closed. Pipe 34 serves as a wear monitor for providing an exteriorly visible indicator that one or more of the wear bricks 23 has worn through.

While the wear bricks 24, 25 and 26 are locking in their positions by the castable mixture 21, the series of wear bricks 23 are removable from the pipe elbow through access provided by removing cover plate 15. A coating of a suitable mold release agent 39 prevents the mixture 21 located behind bulkhead 27 from adhering to the facing surfaces of the wear bricks 23, bulkhead 27 or sides 12 and 14 of casing 11. This allows the portion of castable mixture 21 located behind bulkhead 27 to be easily removed in order to access the wear bricks 23. An example of a suitable mold release agent is type P5CL marketed by Chem-Trend Products of Howell, Michigan.

Figure 5:
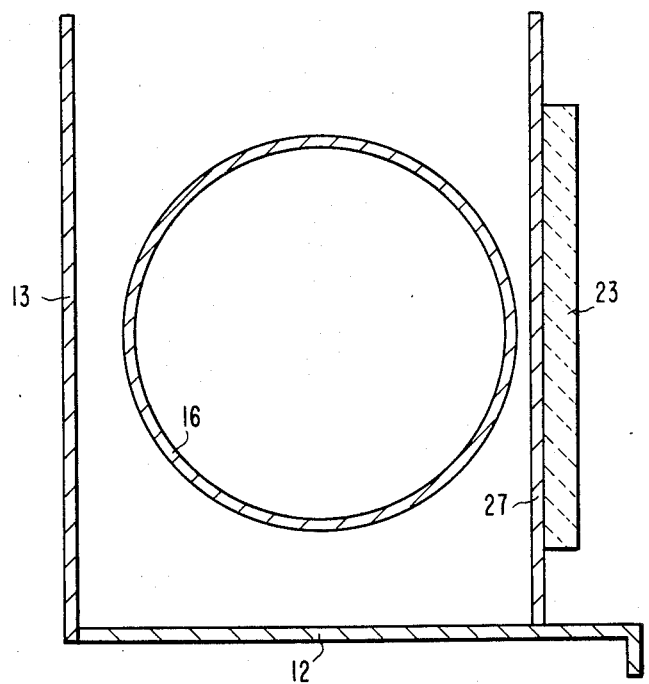
FIGS. 5-7 are section views of the pipe elbow taken along line 4—4 in FIG. 2 showing successive steps in the method of construction.
Figure 6:
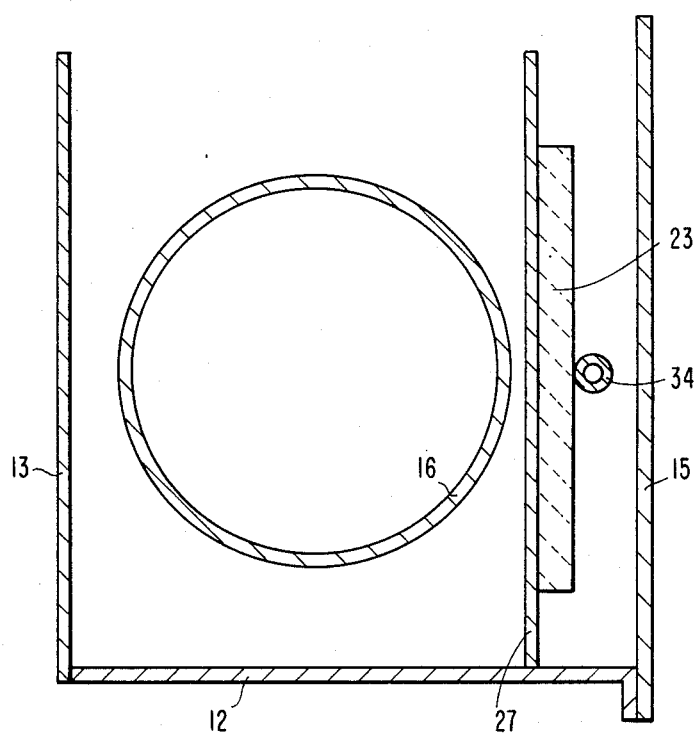
Figure 7:
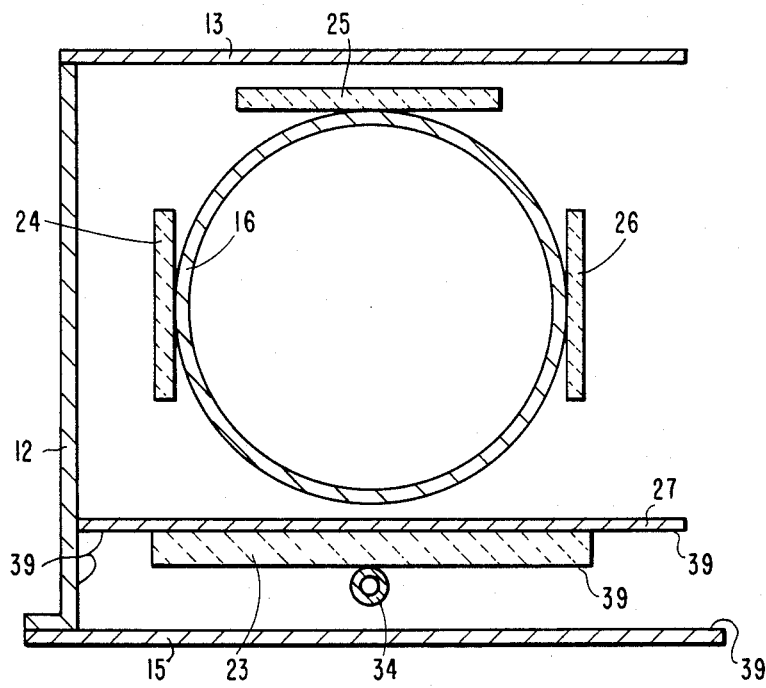

Construction of the pipe elbow 10 is best understood by reference to FIGS. 5-7. Initial fabrication of the pipe elbow is accomplished by joining the sides 12 and 13 of the outer casing 11 and fabricating together the mitered casing sections forming sacrificial liner 16. Wear bricks 24 are secured to the sacrificial liner 16 by a suitble adhesive and the sacrificial wear liner 16 is attached to sides 12 and 13 in the proper spaced relationship shown in FIG. 5 by metal connecting straps (not shown). Bulkhead 27 is bent to conform to the curvature of the pipe elbow and tack welded to the sacrificial liner 16 alon the outside center line at joints 17. A 2" wide strip of masking tape is applied to the outer facing surface of bulkhead 27 aligned along the outside center line and a mold release agent 39 is applied to the outside facing surface of the bulkhead 27, adjacent surfaces of sides 12 and 14 and the inside facing surface of cover plate 15. Once the mold release agent 39 has dried, the masking tape is removed from bulkhead 27 and wear bricks 23 are attached end-to-end in a keystone arrangement to bulkhead 27 by applying a suitable adhesive to the surface portion of the bulkhead which was previously covered by masking tape. Tube 34 is then secured by a suitable adhesive to the outer facing surface of the wear bricks 23 in a position aligned along the outside center line of the pipe elbow and mold release agent is applied to the outside facing surfaces of wear bricks 23. Next, the series of wear bricks 25 and 26 are secured in their respective positions on the outer surface of sacrificial liner 16 by a suitable adhesive. At this point, a gasket is applied to the flanges on cover plate 15, the plate is bolted to side 12 and the cavities on both sides of the bulkhead 27 are then filled with castable ceramic mixture 21. After mixture 21 has cured, side 14 is welded to side 13 and bolted to cover plate 15. The circular end cavities between wearliner 16 and flanges 18 and 19 are then respectively ringed with the series of wear bricks 31 and 32 in a keystone arrangement, the bricks 31 and 32 being cemented in place with a suitable adhesive.

Once placed in service, the wear bricks 23 can be replaced when necessary without removing the pipe elbow 10 from adjacent pipe sections. This task can be accomplished periodically as part of routine maintenance, or maintenance can be delayed until an excessive wear condition is signalled by tube 34 which serves as a wear monitor. Once any of the wear bricks 23 are worn through, tube 34 will be worn through very rapidly, allowing particulate material to flow through tube 34 outside the open end 35. This will occur well before the cover plate 15 is exposed to wear from material flowing through the pipe elbow and presumably repair can be scheduled before there is any general failure of the pipe elbow.

Replacement of worn out wear bricks 23 can be accomplished with the pipe elbow still attached to adjacent pipe sections, thereby lessening system down time. This is accomplished as follows: first, cover plate 15 is removed exposing the castable mixture 21. Because the facing surfaces of bulkhead 27, side 12 and bricks 23 are coated with mold release agent 39, it is possible to remove this section of mixture 21 so as to expose wear bricks 23. Preferably all of the wear bricks 23 are removed and replaced, however, if desired, only the wear bricks 23 which show substantial wear may be removed and replaced. Once this is done, a new tube 34 is secured to the back surface of the wear bricks 23 and a trowellable mixture of wear resistant particles and binder is trowelled into the cavity between wear bricks 23 and cover plate 15. A suitable trowellable ceramic mixture product is marketed by Cerline Ceramic Corp. of Anderson, Ind. under the trademark Cerface ®. After curing, the cover plate 15 is resealed to sides 12 and 14 of the outer casing with a new gasket and bolted in position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising:
a pipe elbow defining a tubular shaped flow passageway for allowing the transmission of abrasive materials therethrough, said pipe elbow including an outer casing having an inner surface, said pipe elbow further including a sacrificial liner and an inner wear liner lining the entire inner surface of said outer casing, said sacrificial liner spaced inwardly from said outer casing and defining said flow passageway, said inner wear liner having a substantially greater wear resistance to abrasive material flowing therethrough than said outer casing, said inner wear liner including a castable mixture of wear resistant particles and binder cast in the space between said outer casing and said sacrificial liner, said inner wear liner further including no more than four series of abrasion resistant polyhedron shaped wear bricks encased within said castable mixture and arranged along the length of said pipe elbow, said wear bricks having a planar shaped surface which faces in a direction generally towards the center line of said pipe elbow, said mixture of wear resistant particles and binder extending entirely around said flow passageway.

2. An apparatus, comprising:
a pipe elbow defining a tubular shaped flow passageway for allowing the transmission of abrasive materials therethrough, said pipe elbow including an outer casing having an inner surface, said pipe elbow further including a sacrificial liner and an inner wear liner lining the entire inner surface of said outer casing, said sacrificial liner spaced inwardly from said outer casing and defining said flow passageway, said inner wear liner having a substantially greater wear resistance to abrasive material flowing therethrough than said outer casing, said inner wear liner including a castable mixture of wear resistant particles and binder casted in the space between said outer casing and said sacrificial liner, said inner wear liner further including a first plurality of abrasion resistant polyhedron shaped wear bricks encased within said castable mixture and arranged along the length of said pipe elbow about that portion of the inner wear liner of said pipe elbow which subscribes an arc extending at least about fifteen degrees on either side of the outside center line of said pipe elbow, each of said first plurality of abrasion resistant wear bricks having a planar shaped surface which faces in a direction generally towards the center line of said pipe elbow, said mixture of wear resistant particles and binder extending entirely around said flow passageway.

3. The apparatus of claim 1 wherein said first plurality of abrasion resistant wear bricks is disposed about that portion of said inner wear liner of said pipe elbow which subscribes an arc not exceeding sixty degrees on either side of the outside center line of said pipe elbow.

4. The apparatus of claim 2 wherein said first plurality of abrasion resistant wear bricks is disposed about that portion of said inner wear liner of said pipe elbow which subscribes an arc extending approximately forty-five degrees on either side of the outside center line of said pipe elbow.

5. The apparatus of claim 1 wherein said planar shaped surface on each of said first plurality of abrasion resistant wear bricks is perpendicular to the plane of curvature of said pipe elbow.

6. The apparatus of claim 5 wherein said inner wear liner includes second, third, and fourth pluralities of abrasion resistant wear bricks positioned at locations which are spaced apart from each other and said first plurality of wear bricks, said first, second, third, and fourth pluralities of wear bricks disposed at positions angularly spaced apart 90 degrees about the center line of said pipe elbow.

7. The apparatus of claim 6 wherein said first, second, third, and fourth pluralities of abrasion resistant wear bricks are high alumina ceramic wear bricks having a rectangular shaped cross section and said wear resistant particles in said mixture are made of ceramic.

8. The apparatus of claim 1 wherein said casing defines an arcuate opening along the length thereof and includes a cover plate removably covering said arcuate opening, said pipe elbow further including a coating of mold release agent between said first plurality of abrasion resistant wear bricks and said mixture thereby permitting said first plurality of abrasion resistant wear bricks to be easily removed from said pipe elbow and replaced.

9. The apparatus of claim 8 wherein said pipe elbow further includes a wear monitoring means for externally monitoring an excessive wear condition in said first plurality of abrasion resistant wear bricks, said wear monitoring means signallng an excessive wear condition prior to any complete wearing through of said pipe elbow.

10. The apparatus of claim 9 wherein said wear monitoring means includes a pipe section made from a readily worn material and extending along said first plurality of abrasion resistant wear bricks on the side opposite said passageway and aligned with the outside center line of said pipe elbow.

11. An apparatus, comprising:

a pipe elbow for allowing the transmission of abrasive materials therethrough, said pipe elbow including a casing having an inner surface and an inner wear liner lining the inner surface of said casing, said pipe elbow further including a sacrificial liner disposed circumferentially inwardly from said casing and spaced apart therefrom, said sacrificial liner defining a flow passageway through said pipe elbow, said inner wear liner having a substantially greater wear resistance to abrasive material flowing through said flow passageway than said casing, said inner wear liner including a castable mixture of wear resistant particles and binder casted in the space between said casing and said sacrificial liner and a first plurality of polyhedron shaped abrasion resistant wear bricks disposed and arranged along the length of said pipe elbow encased within said castable mixture, said first plurality of polyhedron shaped abrasion resistant wear bricks disposed about a portion of the inner wear liner of said pipe elbow subscribing an arc extending on either side of the outside center line of said pipe elbow, said casing defining an opening along the length thereof and including a cover plate removably covering said opening, said pipe elbow further including a coating of mold release agent between said first plurality of abrasion resistant wear bricks and said mixture thereby permitting said first plurality of abrasion resistant wear bricks to be easily removed from said pipe elbow and replaced, said mixture of wear resistant particles and binder extending entirely around said flow passageway.

12. The appartus of claim 11 wherein said first plurality of abrasion resistant wear bricks is disposed about that portion of said inner wear liner of said pipe elbow which subscribes an arc extending at least about fifteen degrees and not exceeding sixty degrees on either side of the outside center line of said pipe elbow.

13. The apparatus of claim 12 wherein said first plurality of abrasion resistant wear bricks is disposed about that portion of said inner wear liner of said pipe elbow which subscribes an arc extending approximately forty-five degrees on either side of the outside center line of said pipe elbow.

14. The apparatus of claim 13 wherein said inner wear liner includes second, third, and fourth pluralities of abrasion resistant wear bricks positioned at locations which are successively angularly spaced apart 90 degrees from said first plurality of abrasion resistant wear bricks relative to the center line of said pipe elbow.

15. The apparatus of claim 14 wherein said inner wear liner includes a sacrificial liner disposed inwardly of said mixture, said sacrificial liner made from a material which is substantially less resistant to abrasive wear conditions than said inner wear liner.

* * * * *

UNITED STATES PATENT AND TRADEMARK OFFICE
CERTIFICATE OF CORRECTION

PATENT NO. : 4,684,155
DATED : August 4, 1987
INVENTOR(S) : Thomas E. Davis

It is certified that error appears in the above-identified patent and that said Letters Patent is hereby corrected as shown below:

In column 1, line 67, please change "reference" to --references--.
In column 5, line 64, please change "locking" to --locked--.
In column 6, line 15, please change "suitble" to --suitable--.
In column 6, line 21, please change "alon" to --along--.
In column 6, line 49, please change "wearliner" to --wear liner--.
In column 8, line 3, please change "casted" to --cast--.
In column 8, line 66, please change "signallng" to --signalling--.
In column 9, line 21, please change "casted" to --cast--.

Signed and Sealed this

First Day of December, 1987

Attest:

DONALD J. QUIGG

*Attesting Officer*   *Commissioner of Patents and Trademarks*